(12) United States Patent
Rutler

(10) Patent No.: US 7,744,170 B1
(45) Date of Patent: Jun. 29, 2010

(54) WEATHER RESISTANT CONTAINER FOR DISPLAYING BUILDING PERMITS AND STORING CONSTRUCTION DOCUMENTS

(75) Inventor: Jay B. Rutler, Overland Park, KS (US)

(73) Assignee: Pro-Vent, Inc., Olathe, KS (US)

( * ) Notice: Subject to any disclaimer, the term of this patent is extended or adjusted under 35 U.S.C. 154(b) by 613 days.

(21) Appl. No.: 11/621,338

(22) Filed: Jan. 9, 2007

(51) Int. Cl.
*A47B 81/00* (2006.01)

(52) U.S. Cl. .................. 312/102; 312/291; 312/296

(58) Field of Classification Search ......... 312/100–102, 312/291, 296, 310
See application file for complete search history.

(56) References Cited

U.S. PATENT DOCUMENTS

| | | | | |
|---|---|---|---|---|
| 1,453,658 | A | * | 5/1923 | Clough .................. 40/647 |
| 1,471,481 | A | * | 10/1923 | Gobberdiel .............. 40/535 |
| 2,315,158 | A | | 3/1943 | Markham |
| 2,532,289 | A | | 12/1950 | Cahill |
| 3,405,836 | A | * | 10/1968 | Regis, Jr. ................ 220/522 |
| 3,927,792 | A | | 12/1975 | Andrade et al. |
| 4,255,872 | A | * | 3/1981 | Williams, Sr. ........... 434/308 |
| 4,334,373 | A | | 6/1982 | Bryan |
| 4,574,504 | A | | 3/1986 | Holmer |
| 4,821,440 | A | | 4/1989 | Dunn |
| 4,850,014 | A | * | 7/1989 | Gillis et al. ........... 379/413.02 |
| D304,348 | S | | 10/1989 | Dunn |
| 4,973,797 | A | * | 11/1990 | Jorgensen et al. ......... 174/53 |
| 4,986,431 | A | | 1/1991 | McCarter |
| 5,401,093 | A | * | 3/1995 | Resnick ................. 312/234.1 |
| 5,435,641 | A | * | 7/1995 | Dumon Dupuis et al. 312/223.1 |
| 5,513,746 | A | | 5/1996 | Anderson |
| 5,623,778 | A | | 4/1997 | Dunn |
| 5,664,851 | A | | 9/1997 | Dunn |
| 5,800,027 | A | | 9/1998 | Dunn |
| 5,894,931 | A | | 4/1999 | Dunn |
| 6,012,786 | A | | 1/2000 | Dunn |
| 6,095,625 | A | * | 8/2000 | Harris et al. ............ 312/274 |
| 6,860,573 | B2 | | 3/2005 | Dunn et al. |
| 7,414,190 | B2 | * | 8/2008 | Vo ........................ 174/50 |
| 2003/0234599 | A1 | | 12/2003 | Dunn et al. |

FOREIGN PATENT DOCUMENTS

GB 2131002 * 6/1984

* cited by examiner

*Primary Examiner*—Hanh V Tran
(74) *Attorney, Agent, or Firm*—Erickson, Kernell, Derusseau & Kleypas, LLC

(57) ABSTRACT

A weather resistant permit display apparatus includes a base, a cover hingedly connected to the base and a permit display panel connected to the base inside of the cover when the cover is in a closed position. A transparent portion of the cover allows a permit mounted on the display panel to be viewed through the closed cover. The display panel may be hingedly connected to the base to provide access to a document bin positioned behind the display panel.

18 Claims, 5 Drawing Sheets

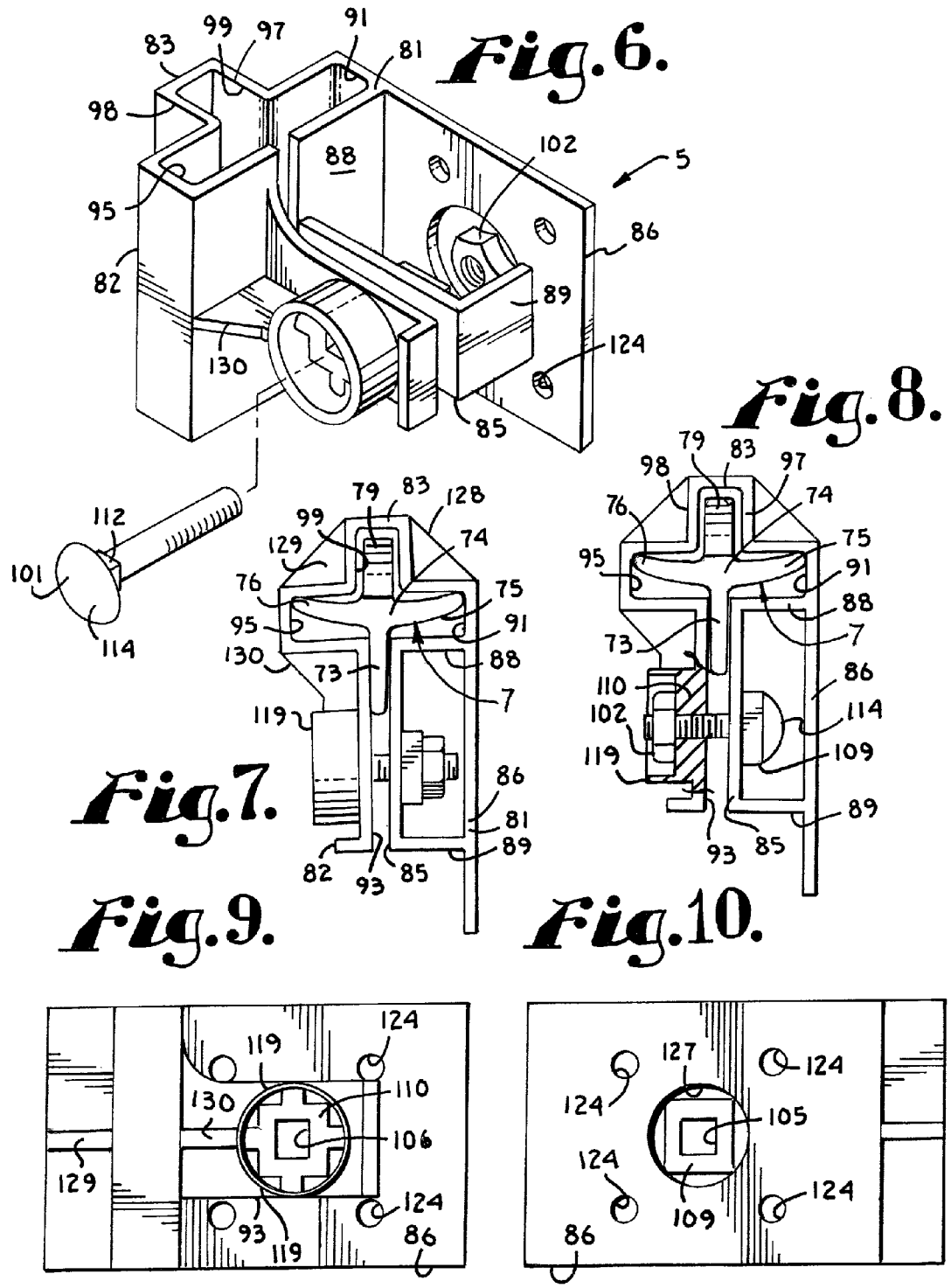

WEATHER RESISTANT CONTAINER FOR DISPLAYING BUILDING PERMITS AND STORING CONSTRUCTION DOCUMENTS

BACKGROUND OF THE INVENTION

1. Field of the Invention

The present invention relates to storage and display devices for weather resistant display of a building permit and storage of other documents at a construction site.

2. Description of the Related Art

Many cities require building permits to be displayed and accessible to inspectors at construction sites. In addition to providing information concerning the basis for the permit, the document may have checkoff spaces for completion by various inspectors during the construction process. The permits thus need to be prominently displayed and made accessible to the proper officials while also being protected from the elements. The permits also need to be protected from theft or tampering by unauthorized persons.

A wide range of display systems have been developed to permit the weather resistant display of building permits on a construction site while permitting access by inspectors. For example, U.S. Pat. No. 4,334,373 discloses a combination building permit display device and rolled blueprint holder. The device includes a flat panel base member with a pocket formed from transparent plastic sheet material for receiving and displaying a building permit while protecting it from the elements. Rolled documents are stored in a cylindrical tube with a closed end and an open end.

U.S. Pat. No. 5,664,851 also provides a weather resistant display case for displaying construction permits and for storing documents. The display case includes hingedly connected front and rear halves. A tack board is provided inside the rear half for receiving a permit. The front half includes a window through which the permit can be viewed. Rolled documents may be fitted into mating semi-cylindrical recesses in the front and rear halves.

A problem encountered with existing plan and permit boxes is where to mount the boxes. Existing boxes, including those discussed above, are generally adapted to be either nailed to a wall of the building under construction or nailed to a wooden stake to be driven into the ground. The ability to mount the box to a stake generally addresses the situation where the walls of the building have not yet been erected and there is no structure available yet to nail the box to. Wooden stakes however are not particularly convenient to use. Typically the installer has to bring a sledge hammer or the like to the site to drive the stake into the ground far enough so that it does not work its way out of the ground and fall over. The stakes are prone to break when driving them into the ground and the height of generally available wooden stakes positions the box mounted thereon to low for convenient access. It is also known to mount such boxes on larger wooden posts, such as 4 inch by 4 inch posts. However, installing such posts requires digging a hole and either setting the post in concrete or tamping the dirt around the post to secure it in place, requiring additional time and equipment.

There remains a need for an effective and easy to use apparatus for displaying of construction permits. There also remains a need for an improved system for mounting permit boxes at a construction site.

SUMMARY OF THE INVENTION

The present invention comprises a permit display apparatus including a base and a cover hingedly connected to the base and moveable between open and closed positions. A permit display panel is hingedly connected to the base and positioned inside of the cover. The display panel is moveable between open and closed positions to provide access to a document storage bin positioned behind the permit display panel. The display panel includes a front face with a permit display area. The permit display area is visible through a transparent portion of the cover when the cover is in its closed position. A plurality of resilient bands encircle the display panel and extend across the display area. The bands act in combination to removably attach a permit to the display area of the display panel.

The display apparatus protects the permit and any documents in the document bin by providing weather resistant storage. The first layer of protection is provided by an overhang which extends outwardly from the base above the cover and acts to divert rain water outwardly away from the cover. Secondly, the cover includes a front wall and respective top, bottom, first side and second side edge walls extending rearwardly from the front wall. The edge walls each engage a rear wall of the base and extend into respective gutters formed in the base when the cover is in its closed position. The gutters are formed between outwardly extending inner and outer walls which act to protect the seal between the edge walls of the cover and the rear wall of the base. The gutters also drain water downwardly away from the cover. An outer flange formed on the cover provides extra protection for the hinge side of the cover by engaging a supplemental gutter formed in the base when said cover is in its closed position.

The display apparatus may include one or more clamps for mounting the storage device on a post. The clamps are preferably configured to facilitate mounting of the storage device on a conventional steel T-post with opposed clamping members connected together by a hinge and shaped to receive a T-post therebetween. The ability to mount the storage device on a T-post is beneficial because most contractors carry T-posts in inventory for use in supporting fencing. T-posts are easy to install and fairly sturdy relative to alternative posts and stakes. It is to be understood, however, that the display apparatus may also be mounted on a wooden post or fastened to a wall, and that appropriately placed mounting holes may be provided for that purpose.

Space is also provided on the outer surface of the panel to affix numeric decals to display the address for the construction site.

BRIEF DESCRIPTION OF THE DRAWINGS

FIG. 6 is an exploded, perspective view of a T-post clamp used to secure the permit box to a T-post.

FIG. 7 is a top plan view of the of the T-post clamp connected to a T-post.

FIG. 8 is a view similar to FIG. 7 with portions broken away, showing a carriage bolt and nut in a different orientation than in FIGS. 6 and 7.

FIG. 9 is a front plan view of the clamp.

FIG. 10 is a rear plan view of the clamp.

DETAILED DESCRIPTION OF THE PREFERRED EMBODIMENTS

Figure 1:
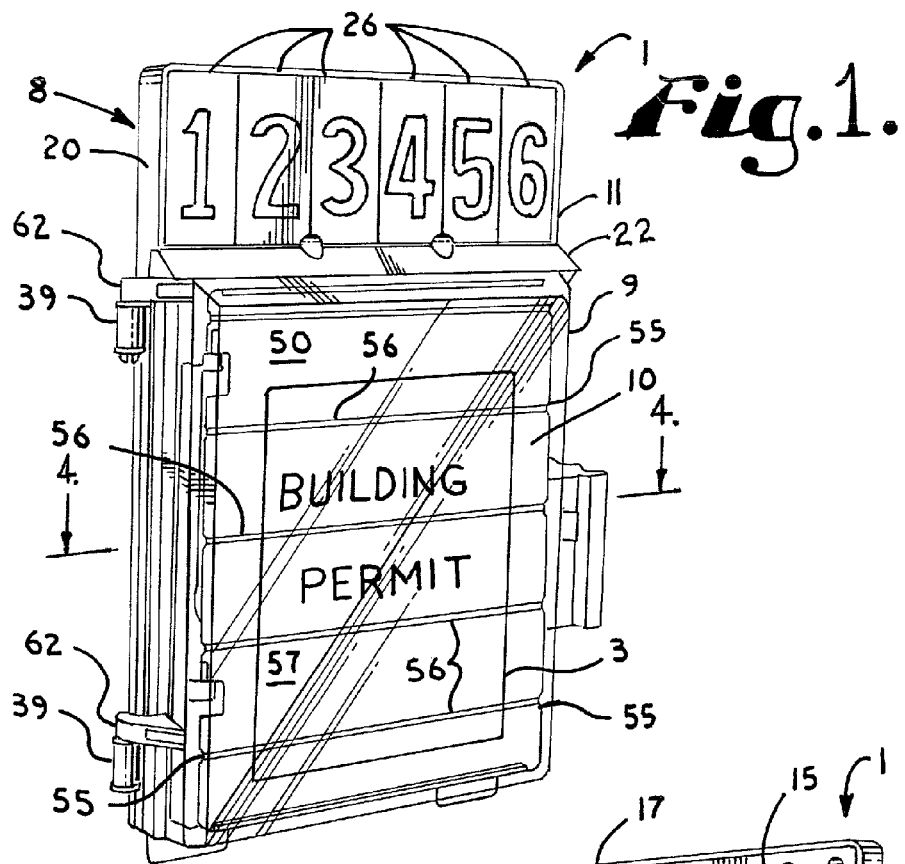
FIG. 1 is a perspective view of a permit box according to the present invention shown with a hinged cover thereof in a closed position.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 2:
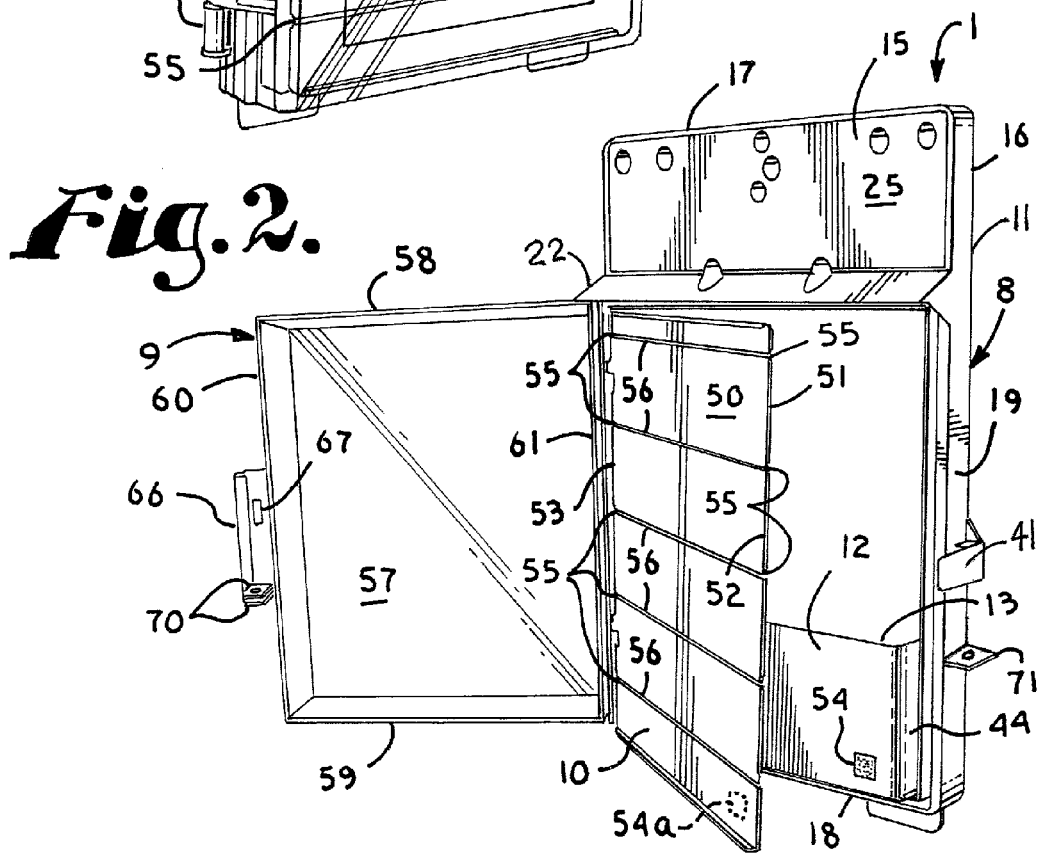
FIG. 2 is a perspective view of the permit box shown with the hinged cover in an open position and a hinged display panel thereof in a partially opened position.

Referring to the drawings in more detail, and in particular to FIGS. 1 and 2, the reference number 1 generally designates a permit box according to the present application. The permit box 1 provides for weatherproof storage and display of a building permit 3. One or more clamps 5 mounted on the permit box 1 (see FIG. 5) are adapted for securing the permit box 1 to a standard metal T-post 7 (see FIGS. 7 and 8). The permit box 1 includes a back panel assembly or base 8, a transparent cover 9 hingedly connected to the base 8, and a permit display panel 10 hingedly connected to the base 8 inside of the transparent cover 9. The display panel 10 is adapted to mount and display the permit 3. The base 8 includes a back panel 11 and a tray 12 which cooperates with the back panel 11 to form a document bin 13 inside of the cover 9 and behind the display panel 10 for storage of notebooks or other construction documents.

The transparent cover 9 is moveable between a cover closed position as in FIG. 1 and a cover open position as in FIG. 2. In the cover closed position, the cover 9 prevents access to both the display panel 10 (and any permit 3 displayed thereon) and the document bin 13, however the permit 3 is visible through the cover 9 due to its transparency. The display panel 10 is moveable between a panel closed position as in FIG. 1 and a panel open position (the display panel 10 is shown in a position between the panel open and panel closed positions in FIG. 2). The document bin 13 is fully accessible when the display panel 10 is in the panel open position.

Looking at the permit box 1 in further detail, the base 8 includes a back panel 11 which may be molded of high strength plastic and includes a front face 15, a rear face 16, opposed top and bottom edges 17 and 18 respectively, and opposed first and second side edges 19 and 20, respectively. The rear face 16 of the back panel 11 provides a mounting location for the clamps 5 (to be discussed in further detail below). Alternatively, the permit box 1 may be mounted on a separate box (not shown) for storing a rolled set of construction documents, such as the rolled plan tube offered by Pro-Vent, Inc. Mounting holes are also provided for mounting the permit box 1 on a wall or wooden post.

Figure 3:
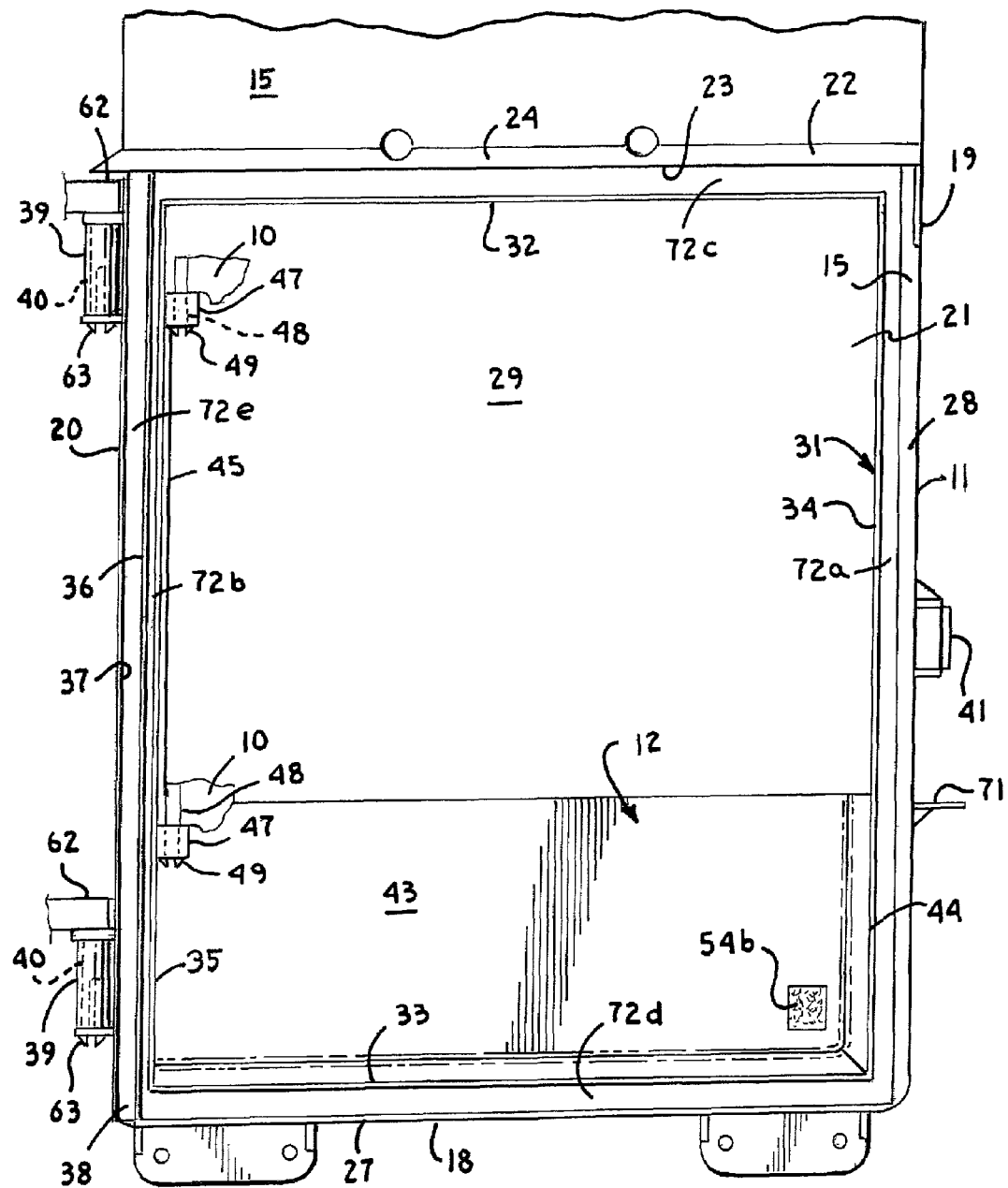
FIG. 3 is a fragmentary front elevational view of the permit box with the front cover and display panel broken away to show the interior of the box.

Referring to FIG. 3, the back panel 11 includes a generally rectangular recessed portion 21 set inwardly from the front face 15. An overhang 22 extends outwardly from the front face 15 above the recessed portion 21. The overhang 22 includes a generally horizontal lower surface 23 and an upper surface 24 which is downwardly sloped away from the front face 15.

Referring again to FIGS. 1 and 2, a generally planar section of the front face 15 above the overhang 22 and extending upwardly to proximate the top edge 17 serves as an address display board 25 and receives adhesive address number plaques 26. The display board 25 may be used to identify the construction site by displaying, for example, the street address, building number or lot number of the construction site.

Referring again to FIG. 3. the recessed portion 21 of the back panel 11 extends downwardly from the lower surface 23 of the overhang 22 to a lower outer wall 27 which runs along the bottom edge 18 of the back panel 11. A first outer sidewall 28 extends vertically from the lower surface 23 of the overhang 22 to the lower wall 27 along the first side edge 19 of the back panel 11 (which is shown as being the right side edge of the back panel 11 in the drawings, however it is foreseen that the left and right edges may be reversed, i.e. that a permit box 1 according to the present invention may be a mirror image of the permit box 1 depicted). A rear wall 29 of the recessed portion 21 extends vertically from the lower surface 23 of the overhang 22 to the lower outer wall 27 and horizontally from the first outer sidewall 28 to the second side edge 20. The rear wall 29 forms a back side of the document bin 13. One or more drain holes 30 (see FIG. 5) are preferably formed through the lower wall 27.

Positioned inside the recessed portion 21 and spaced inwardly from the overhang 22, first outer sidewall 28, lower outer wall 27 and second edge 20 is a rectangular inner enclosure 31 which defines the periphery of the document bin 13. The inner enclosure 31 includes upper and lower inner walls 32 and 33, respectively and first and second inner sidewalls 34 and 35, respectively, which extend forwardly from the rear wall 29. The inner walls 32-35 are shown as extending outwardly from the rear wall 29 a distance which is substantially equal to the depth of the recessed portion 21 such that the forward edges of the first outer sidewall 28, lower outer wall 27, upper inner wall 32, lower inner wall 33, first inner sidewall 34 and second inner sidewall 35 are generally in register, although such an alignment it is not considered to be necessary.

Figure 4:
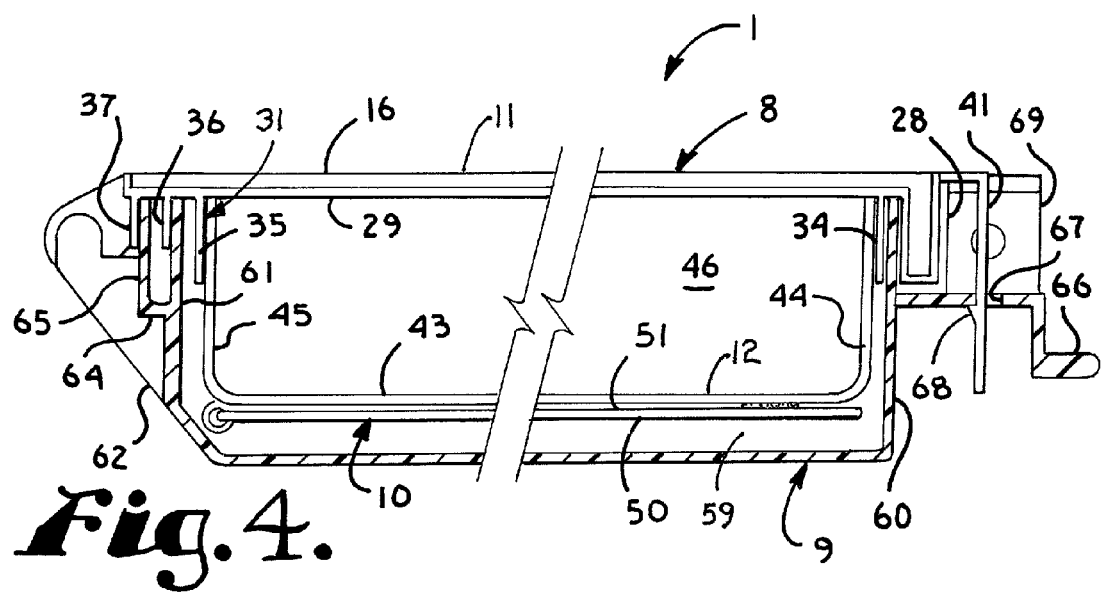
FIG. 4 is a fragmentary cross-sectional view of the permit box taken generally along line 4-4 in FIG. 1.

Between the second side edge 20 of the back panel 11 and the second inner sidewall 35 of the inner enclosure 31, a second outer sidewall 36 and an outer supplemental flange 37 extend outwardly from the rear wall 29 and downwardly from the lower surface 23 of the overhang 22 to the bottom edge 18 of the back panel 11. The second outer sidewall 36 is connected to the lower wall 27 at its lower end. A gap or lower opening 38 is left between the second outer sidewall 36 and the outer supplemental flange 37 at their lower ends. As best seen in FIG. 4, the second inner sidewall 35 of the inner enclosure 31, second outer sidewall 36, and outer supplemental flange 37, are of sequentially decreasing depth such that the second outer sidewall 36 extends outwardly from the rear wall 29 less than the second inner sidewall 35 and the outer supplemental flange 37 extends outwardly from the rear wall 29 less than the second outer sidewall 36. The second outer sidewall 36 may be, for example, about one half the depth of the second inner sidewall 35.

Connected to the second side edge 20 of the back panel 11 and the outer supplemental flange 37 are a pair of vertically spaced hinge sleeves 39. The sleeves 39 receive respective hinge pins 40 formed on the transparent cover 9 to pivotally connect the cover 9 to the back panel 11. The second side edge 20 can thus also be considered the "hinge side" of the back panel 11. The first side edge 19 of the back panel 11 includes a latch pawl 41 for engaging corresponding latch structure on the cover 9 (to be described below), and thus the first side edge of the back panel 11 can also be considered the "latch side" of the back panel 11.

The tray 12 is connected to the back panel 11 to complete the base 8. The tray 12 also forms a front side of the document bin 12 and is secured to the rear wall 29 of the back panel 11 immediately inside of the enclosure 31. The tray 12 may be secured to the back panel 11 using, for example, self-tapping screws (not shown) extending through openings in the rear wall 29 and engaging respective screw bosses formed in the tray 12. Although the back panel assembly or base 8 is described and shown as being of two piece construction comprising a back panel 11 and separate tray 12, it is foreseen that the back panel assembly 8 may be capable of being formed as a single piece. As used herein, the term back panel assembly is intended to include items of multi-piece or single piece construction.

The tray 12 includes a front wall 43, a first sidewall 44, a second sidewall 45, and a bottom wall 46. The front wall 43 and first sidewall 44 are preferably of a height which allows documents, including notebooks or the like, to be easily placed in the document bin 13 by lifting them over the front wall 43 and dropping them into the bin 13 to rest on the bottom wall 46. The height of the front wall 43, however, should be sufficient to retain documents in the bin 13 and prevent them from toppling out. A preferred height for the front wall 43 would be in the range of 4 to 6 inches. The front wall 43 and first sidewall 44 are preferably of a height which allows documents, including notebooks or the like, to be easily placed in the document bin 13 by lifting them over the front wall 43 and dropping them into the bin 13 to rest on the bottom wall 46. The height of the front wall 43, however, should be sufficient to retain documents in the bin 13 and prevent them from toppling out. A preferred height for the front wall 43 would be in the range of 4 to 6 inches.

The second sidewall 45 of the of the tray 12 is taller than the front wall 43 or first sidewall 44 such that the second sidewall 45 extends upward past the front wall 43. A pair of vertically spaced hinge sleeves 47 are formed on the second sidewall 45 in vertically spaced relation, and each sleeve 47 receives a respective one of hinge pins 48 on the permit display panel 10. The hinge pins 48 each have distal ends with outwardly extending resilient barbs 49 for retaining the hinge pins 48 in the respective sleeves 47.

Referring again to FIGS. 1 and 2, the permit display panel 10 is generally planar and includes opposed front and back faces 50 and 51 respectively, and opposed first and second side edges 52 and 53, respectively. The hinge pins 48 are positioned proximate the second side edge 52. The permit display panel 10 is moveable between open and closed positions, and is selectively held in the panel closed position by a latch 54, which may comprise, for example mating pads of hook-and-loop material 54a and 54b wherein one of the pads 54a is mounted on the back face 51 of the display panel 10 and the mating pad 54b is mounted on the front wall 43 of the tray 12.

Each of the side edges 52 and 53 of the permit display panel 10 has a plurality of notches 55 formed therein. The notches 55 are arranged in laterally opposed pairs, and each pair of notches 55 receives and retains a respective resilient rubber or elastic band 56 which is stretched around the panel 10 and across the front and back faces 50 and 51. The building permit 3 is secured to the front face 50 of the display panel 10 by consecutively stretching the bands 56 in a forward direction and sliding the permit 3 behind the bands 56. The resiliency of the bands 56 is selected to be sufficient to hold the permit 3 in position on the panel 10, but the width of each band 56 is preferably narrow enough that the bands 56 do not obscure a significant portion of the written matter on the permit 3. The notches 55 are useful in retaining the bands 56 in preferred positions along the display panel 10, however it is foreseen that the bands 56 can also work acceptably well to retain the permit 3 to a panel 10 without notches 55.

In particular reference to FIG. 2, the cover 9 is preferably molded or otherwise formed of transparent plastic and is sized to cover the inner enclosure 31. The cover 9 includes a transparent front panel 57, rearwardly extending top and bottom edge walls 58 and 59 respectively, and rearwardly extending first and second side edge walls 60 and 61, respectively. The walls 58-61 are of substantially the same depth such that rearward edges of each of the walls 58-61 generally lay in the same plane.

Figure 5:
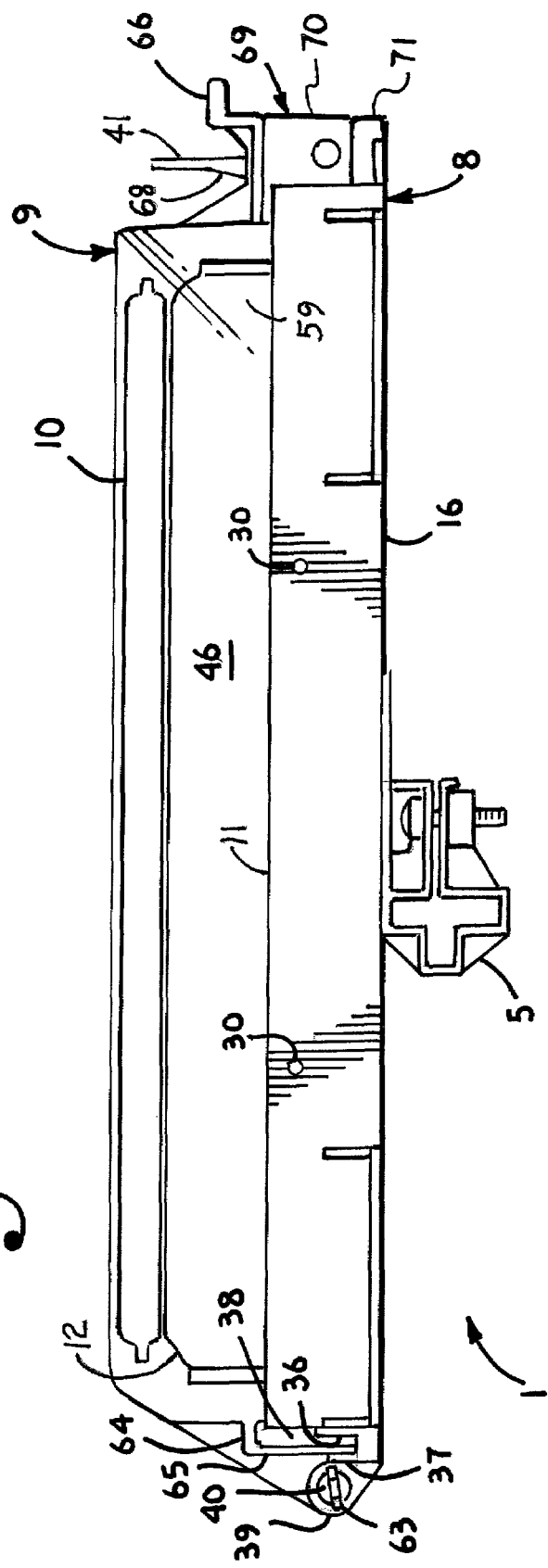
FIG. 5 is a bottom plan view of the permit box.

As best seen in FIGS. 1, 4 and 5, the hinge pins 40 which pivotally connect the cover 9 to the back panel 11 are mounted on lever arms 62 which extend outwardly from the second side edge wall 61. The hinge pins 40 extend downwardly from the lever arms 62 and are rotatably received in the hinge sleeves 39 on the back panel 11. A portion of the upper lever arm 62 is captured beneath the overhang 22 through most of the range of motion of the cover 9 such that the cover 9 cannot be removed by lifting the hinge pins 40 out of the sleeves 39 unless the cover 9 is in its fully open position. Like the hinge pins 48 on the display panel 10, the hinge pins 40 each have distal ends with outwardly extending resilient barbs 63 for retaining the hinge pins 40 in the respective sleeves 39. As best seen in FIG. 4, the forward edges of the lever arms 62 and the adjacent side of the cover 9 are beveled inwardly in order to provide for wider opening of the cover 9 if the apparatus 1 is mounted to a wall.

Referring to FIGS. 4 and 5, the cover 9 further includes a front flange 64 extending laterally outward from the second side edge wall 61 and an outer flange 65 which extends rearwardly from the front flange 64 in a plane generally parallel to the plane of the second side edge wall 61. The outer flange 65 has a depth selected such that the rearward edge of the outer flange 65 is generally coplanar with rearward edges of the walls 59-61. It should be noted that the depths of the second outer sidewall 36 and the outer supplemental flange 37 on the back panel 11 are selected to allow the second side edge wall 61 and outer flange 65, respectively, on the cover 9 to swing past in closely spaced relation as the cover 9 is closed.

As best seen in FIG. 2, a handle 66 extends laterally outward from the first side edge wall 60 of the cover 9 and includes a rectangular opening 67 formed therein for receiving the latch pawl 41. As shown in FIG. 4, the pawl 41 extends through the opening 67 when the cover 9 is closed and a barb 68 on the pawl 41 overlaps a portion of the handle 66 to retain the cover 9 in the closed position. To release the cover 9 for opening, the pawl 41 may be flexed such that the barb 68 is urged away from the overlapped portion of the handle 66. In order to further secure the contents of the permit box 1, a hasp 69 for receiving a padlock (not shown) may also be included. Referring to FIG. 2, the hasp 69 may include a pair of spaced apart parallel flanges 70 extending rearwardly from the handle 66 and an intermediate flange 71 fixed to the outer first side edge 19 of the back panel 11 in a position to extend between the flanges 70. As best seen in FIG. 5, aligned openings in the flanges 70 and 71 are positioned to simultaneously receive the shackle of the padlock to lock the cover 9 in the closed position.

Referring to FIGS. 2, 4 and 5, the rearward edges of the walls 58-61 of the cover 9 come into abutting relation with the rear wall 29 of the recessed portion 21 of the back panel 11 when the cover 9 is fully closed and rearward portions of the walls 58-61 are received in respective gutters 72a-72d formed around the walls 32-35 of the enclosure 31 (best seen in FIG. 3). A rearward portion of the first side edge wall 60 of the cover 9 extends into a first side gutter 72a formed between the first outer sidewall 28 of the back panel 11 and the first inner sidewall 34 of the enclosure 31. Similarly, a rearward portion of the second side edge wall 61 extends into a second side gutter 72b formed between the second inner sidewall 35 of the enclosure 31 and the second outer sidewall 36 of the back panel 11. A rearward portion of the top edge wall 58 of the cover 9 extends into a top gutter 72c between the lower surface 23 of the overhang 22 and the upper inner wall 32 of the enclosure 31, and a rearward portion of the bottom edge wall 59 extends into a bottom gutter 72d formed between the lower outer wall 27 and the lower inner wall. The bottom gutter 72d is in communication with the drain holes 30 formed through the lower outer wall 27.

Additionally, when the cover 9 is closed, the rearward edge of the outer flange 65 on the cover 9 also comes into abutting relation with the rear wall 29. A rearward portion of the outer flange 65 extends into a supplemental gutter 72e formed between the second outer sidewall 36 and outer supplemental flange 37 of the back panel 11. The supplemental gutter 72e is in communication with the lower opening 38.

An important feature of the permit box 1 is its excellent weather resistance, and in particular its ability to turn water away from the documents on the display panel 10 and in the document bin 13. With the cover 9 closed, the first line of weather resistance is provided by the sloped upper surface 24 of the overhang 22 which acts to divert rain water outwardly and away from the rearward edges of the walls 58-61 of the cover 9. Any water which enters the gutters 72a-72d around the walls 58-61 will flow along and down the gutters 72a-72d and out the drain holes 30 in the lower wall 27, or will flow over the front edge of the lower wall 27. Because of the action of the gutters 72a-72d and the relatively tight fit between the walls 58-61 and the rear wall 29, very little if any water will work past the walls 58-61. Any minimal amount of water which does work past the walls 58-61 will not be able to get past the inner walls 32-35 and into the enclosure 31. Instead, this water will remain in the gutters 72a-72d and will flow downwardly to seep out between the lower edge wall 59 of the cover 9 and the rear wall 29 and exit the box 1 through the drain holes 30 or over the front edge of the lower wall 27.

The hinge side of the box 1 is further protected by the outer flange 65 on the cover 9 which seats in the gutter 72e proximate outer supplemental flange 37 to protect the joint between the second side edge wall 61 of the cover 9 and the second outer sidewall 36 of the back panel 11. This extra protection is advisable since the second outer sidewall 36 must be shorter than the first outer sidewall 28 and lower wall 27 to allow the second side edge wall 61 to swing past as the cover 9 is closed and would, therefore, be the most prone to allow water to enter without the outer supplemental flange 37 and the outer flange 65. Any water which gets past the outer flange 65 will flow down the gutter 72e and out the lower opening 38.

The clamps 5 are mounted on the rear face 16 of the back panel 11 and are adapted to secure or mount the permit box 1 on a post such as a conventional studded steel T-post 7. As best seen in FIGS. 7 and 8, the T-post 7 shown has a generally T-shaped cross-section, with a stem 73 and cross member 74 with first and second cross arms 75 and 76 and studs 79 formed at regular spaced intervals along the length of the cross member 74. Each of the stem 73, cross-member 74, cross arms 75 and 76 and studs 79 may be referred to as a portion of the T-post onto which the clamps 5 may be secured.

Each clamp 5 generally comprises inner and outer clamp halves or clamp members 81 and 82 which are connected together at one end by a flexible web or hinge 83. As used herein, the term hinge is intended to include a flexible web of material as shown in the disclosed embodiment as well as other structure commonly referred to as hinge or providing a hinging function. The inner clamp half 81 may also be referred to as a stationary clamp half and the outer clamp half 83 may be referred to as a movable clamp half. The inner clamp half 81 includes an inner clamp plate or clamping surface 85 spaced outward from a mounting panel 86 in parallel, planar relationship therewith by inner and outer legs 88 and 89. A first cross arm receiver or hook 91 is formed in the inner clamp half 81 between the inner clamping member 85 and hinge 83. The first cross arm receiver 91 defines a slot sized to receive the first cross arm 75 of the T-post cross member 74. The first cross arm receiver 91 hooks onto the first cross arm 75 to prevent the clamp 5 from being pulled sideways or laterally off of the T-post 7.

The outer clamp half 82 includes an outer clamp plate or clamping surface 93 positioned opposite of and in generally parallel planar spaced relationship with the inner clamping plate 85. A second cross arm receiver or hook 95 is formed in the outer clamp half 82 between the outer clamping member 93 and the hinge 83. The second cross arm receiver 95 similarly defines a slot sized to receive the second cross arm 76 of the T-post cross member 74. The second cross arm receiver 91 hooks onto the second cross arm 76 to prevent the clamp 5 from being pulled sideways or laterally off of the T-post 7.

The first cross arm receiver 91 is spaced from the flexible web 83 by a first wall segment 97 and the second cross arm receiver 95 is spaced from the flexible web 83 by an opposed second wall segment 98. The web 83 spaces the first and second opposed wall segments 97 and 98 apart to form a stud receiving channel 99 sized to accommodate or receive any of the studs 79 on the T-post 7.

The inner and outer clamp halves 81 and 82 are sized and shaped to slide onto a T-post from an upper end thereof. A clamp 5 is oriented and mounted on a T-post 7 such that the stem 71 extends between the inner and outer clamping plates 85 and 93, the first and second cross arms 75 and 76 of cross member 74 extend into the first and second cross arm receivers 91 and 95 respectively and the stud receiving channel 99 is positioned to receive any of the studs 79 over which the clamp 5 is positioned. The inner and outer clamping plates 85 and 93 are then drawn toward each other and compressed against the stem 73 of the T-post 7 to fix the relative position of the clamp 5 to the T-post 7 and prevent the permit box 1 from sliding axially along the T-post 7.

The clamp halves 81 and 82 are also preferably sized such that inner surfaces of the first and second cross arm receivers 91 and 92 engage and compress against outer ends of the cross arms 75 and 76 respectively when the clamping members 85 and 93 are drawn against the stem 73 of the T-post 7. The engagement of the cross arms 75 and 76 by the clamp halves 81 and 82 provides further clamping action for securing the clamp 5 to the T-post 7. Because there generally is no standard spacing of the studs 79 on T-posts from different manufacturers, the clamp halves 81 and 82 in the embodiment shown are designed so as not to directly engage or clamp onto the studs 79, although the clamp halves 81 and 82 could be modified to do so.

It is foreseen that the clamp halves 81 and 82 could be formed separately without a hinge connecting the two halves together. As used herein the term clamp halves is not intended to be limited to structure that is approximately equivalent in size. It is to be understood that one of the clamp halves could be significantly larger than the other. For example, it is foreseen that one of the clamp halves may simply comprise a relatively flat clamp panel or member to compress against a portion of the T-post without having a receiver or hook for engaging a cross-arm or other structure on the T-post to prevent lateral sliding relative to the T-post.

In the embodiment shown, the inner and outer clamping members 85 and 93 are drawn together by a carriage bolt 101 and nut 102 extending through aligned, square, bolt holes 105 and 106 formed in the clamping plates 85 and 93 respectively. Annular, square bosses 109 and 110 are formed on respective outer surfaces of the inner and outer clamping plates 85 and 93 around the bolt holes 105 and 106, such that the bolt holes 105 and 106 are at least as long as a square shoulder section 112 of the carriage bolt 101 used therewith. The bolt holes 105 and 106 are sized to snugly receive the square shoulder section 112 of the carriage bolt 101.

The carriage bolt may be inserted through the bolt holes 105 and 106 such that its head 114 abuts against the boss 110 on the outer clamping plate 93 and the nut abuts against the boss 109 on the inner clamping plate 85 (as shown in FIGS. 6 and 7) or vice versa (as shown in FIG. 8). A cylindrical wall 119 is formed on the outer surface of the outer clamping plate 93 in spaced relationship around the boss 110. When the carriage bolt 101 is oriented with its head against the boss 109 on the inner clamping plate 85 and the nut 102 against the boss 110 on outer clamping plate 93 (as in FIG. 8) access to the nut 102 can only be had with a socket wrench. The cylindrical wall 119 thereby deters vandals or the like from readily removing the permit box 1 from the T-post 7 unless they happen to be carrying a socket wrench.

Referring to FIGS. 9 and 10, four mounting holes 124 are formed in the mounting panel 86. Fasteners may be driven through mounting holes 124 to connect the clamp 5 to the back panel 11 of the permit box 1. The centrally disposed hole 127 through mounting panel 86 is used for molding purposes to facilitate the molding of boss 109 and bolt hole 105 using a slide as is known in the molding arts. In addition, hole 127 allows insertion of the carriage bolt 101 therethrough in the orientation as shown in FIG. 8 with the head 114 positioned against the boss 109 on the inner clamp half 81. Gussets 129, 130 and 131 are formed as part of the clamp 5 to provide desired structural support.

In most applications it is believed that two clamps 5 will be used to mount the permit box 1 to a T-post 7. T-posts are usually carried by most contractors for use in putting in temporary fencing or other applications on a job site and are generally relatively easy to install versus any wooden post which would be large enough to provide a stable support for the permit box 1. T-posts are also more durable than smaller wooden stakes and space the permit box 1 above the ground at a level which is higher than most wooden stakes which makes it easier to access documents within the assembly 1.

It is to be understood that while certain forms of the present invention have been illustrated and described herein, it is not to be limited to the specific forms or arrangement of parts described and shown. For example, it is to be understood that the location of the hinges for the cover 9 could be moved to the top or bottom of the cover 9 such that the cover 9 would open upwardly or downwardly. Also in regard to the hinges for the cover 9 and display panel 10, it is to be understood that the relative locations of the hinge pins and hinge sleeves could be reversed, i.e. the pins could be formed on the base 8 and the respective sleeves formed on the cover 9 and/or display panel 10. It is also foreseen that the display panel 10 could be hingedly connected directly to the back panel 11 instead of to the tray 12.

While it is believed that having all four walls of the cover extend into respective gutters provides the best weather resistance, it is foreseen that in some applications the top wall may be adequately protected by the overhang or that the cover may be otherwise designed to make the top gutter unnecessary.

It is also to be understood that the clamps 5 could be modified for use in connecting the permit box 1 to posts of different geometries or that the geometry of the clamps could be modified to engage the T-post 7 in a different manner or orientation. It is also foreseen that the clamps 5 could be integrally formed with the base 8 or the back panel 11 thereof.

What is claimed and desired to be secured by Letters Patent is as follows:

1. A permit display apparatus comprising:
   a) a base including a document storage bin connected to said base for receiving documents therein; and
   b) a cover hingedly connected to said base and moveable between cover open and cover closed positions about at least one cover hinge; at least a portion of said cover being transparent; and
   c) a permit display panel hingedly connected to said document storage bin and positioned in front of said document storage bin and inside of said cover when said cover is in said cover closed position, said display panel being moveable between panel open and panel closed positions and including a front face with a permit display area thereon, said permit display area being visible through said transparent portion of said cover when said cover is in said closed position; and
   d) said document storage bin being freely accessible when said display panel is in said panel open position.

2. The permit display apparatus as in claim 1 wherein said cover includes a front wall and respective top, bottom, first side and second side edge walls extending rearwardly from said front wall toward said base and into respective primary gutters formed in said base when said cover is in said cover closed position each of said primary gutters is formed between respective inner and outer walls extending outwardly from said base.

3. The permit box as in claim 2 wherein said primary gutters interconnect to drain water downwardly away from said cover.

4. The permit display apparatus as in claim 2 wherein said cover is connected to said base by at least one hinge proximate said second side edge wall of said cover, and said cover further includes an outer flange extending parallel to and outside of said second side edge wall and engaging a supplemental gutter formed in said base when said cover is in said cover closed position; said supplemental gutter extending parallel to said primary gutter and receiving said second side edge wall of said cover when said cover is in said cover closed position.

5. The permit display apparatus as in claim 2 and further including an overhang extending outwardly from said base past said primary gutters and above said cover and acting to divert rain water outwardly away from said cover.

6. The permit display apparatus as in claim 5 and further including an address display board on said base above said overhang, said address display board receiving address number plaques to indicate an address.

7. The permit display apparatus as in claim 1 wherein said permit display panel includes attachment means for attaching a permit to said front face of said panel.

8. The permit display apparatus as in claim 1 wherein said permit display apparatus further includes a plurality of resilient bands extending around said permit display panel and across said front face; said bands acting to attach a permit to said display panel.

9. The permit display apparatus as in claim 8 wherein said permit display panel includes opposed edges on opposite sides of said front face and each of said opposed edges includes a plurality of notches, said notches being arranged in opposed pairs, each said opposed pair of notches receiving a respective one of said resilient bands to locate said resilient bands along said display panel.

10. The permit display apparatus as in claim 1 wherein said permit display panel is hingedly connected to said document storage bin on a side of said storage bin proximate to said at least one cover hinge of said cover.

11. The permit display apparatus as in claim 4 wherein where said inner wall, outer wall and outer flange forming said primary gutter and supplemental gutter are parallel, outer wall and outer flange are of reduced height relative to said inner wall.

12. A building permit display box comprising:
   a) a base having a rear wall and first and second sides, said base including a recessed portion defined by a peripheral inner wall extending forwardly from the rear wall;
   b) a cover connected to said base by at least one hinge and moveable between cover open and cover closed positions relative to said base about said at least one hinge, said cover having a front wall and a peripheral wall including a top, bottom, first side and second side edge wall extending rearwardly from said front wall toward said base; said at least one hinge being connected to said cover proximate said second side edge wall, said cover further including an outer flange extending parallel to and outside of said second side edge wall;
   c) a primary gutter formed in said base and defined by said peripheral inner wall and a peripheral outer wall spaced outwardly from said peripheral inner wall and extending forwardly from the rear wall; and
   d) a supplemental gutter defined by said peripheral outer wall and an outer flange spaced outwardly from said peripheral outer wall along said second side of said base and extending forwardly from the rear wall and parallel to said primary gutter;
   e) wherein said outer flange is of a reduced height relative to said inner wall, and when said cover is in said cover closed position said peripheral wall of said cover extends into said primary gutter in said base and said outer flange of said cover extends into said supplemental gutter in said base; and
   f) a permit display area positioned inside of said cover when said cover is in said cover closed position, said permit display area being visible through a transparent portion of said front wall of said cover when said cover is in said cover closed position.

13. The permit display apparatus as in claim 12 and further including an overhang extending outwardly from said base past said primary gutter and above said cover and acting to divert rain water outwardly away from said cover.

14. The permit display apparatus as in claim 12 wherein said permit display area is on a permit display panel hingedly connected to said base and moveable between panel open and panel closed positions and said apparatus further includes a document storage bin positioned behind said permit display panel when said permit display panel is in said panel closed position and freely accessible when said display panel is in said panel open position.

15. The permit display apparatus as in claim 12 and further including attachment means for attaching a permit to said permit display area.

16. The permit display apparatus as in claim 12 wherein said permit display apparatus further includes a plurality of resilient bands extending across said display area; said bands acting to attach a permit to said display panel.

17. The permit display apparatus as in claim 16 wherein said permit display area is on a permit display panel having opposed edges on opposite sides of said display area and each of said opposed edges includes a plurality of notches, said notches being arranged in opposed pairs, each said opposed pair of notches receiving a respective one of said resilient bands to locate said resilient bands along said display area.

18. The permit display apparatus as in claim 12 wherein where said inner wall, outer wall and outer flange forming said primary gutter and said supplemental gutter are parallel and said outer wall and outer flange are of reduced height relative to said inner both wall.

* * * * *